Patented June 29, 1937

2,085,490

UNITED STATES PATENT OFFICE 2,085,490

CHEWING GUM COMPOSITION

Kenneth G. Blaikie, Shawinigan Falls, Quebec, Canada, assignors to Shawinigan Chemicals Limited, Montreal, Canada, a corporation of Canada No Drawing. Application August 14, 1933, Serial No. 685,075

10 Claims. (Cl. 99—135)

This invention relates to a composition of matter suitable for use as chewing gum.

The base of chewing gum now extensively sold is gum chicle. This material has certain disadvantages, particularly its high price and the sticky nature of the material, rendering the gum made therefrom difficult to remove from material on which it is deposited.

According to this invention, certain polyvinyl esters having suitable viscosity form an excellent complete or partial substitute for gum chicle as a base for chewing gum compositions. The polymers when properly made and purified are tasteless and insoluble in water or saliva and are not as sticky as gum chicle, but possess the desirable properties of gum chicle and do not harden on continued chewing. The polymers may be readily incorporated with fillers, plasticizers, softeners, sugar, flavoring matter, and with medicinal, antiseptic, prophylactic, deodorizing or other agents, etc., and may be formed into sticks, sheets or pellets, which at ordinary temperature and when substantially water-free are about as hard as ordinary unchewed chicle gum. When chewed, however, the polymers take up moisture and become soft and ductile. In this state and when warm, the polymers may be pulled out to great length and the resulting thread rolled up and quickly kneaded into a homogeneous mass.

Among the polyvinyl esters, polyvinyl acetate having viscosity between approximately 1.5 and 6 centipoises and made according to the teaching of the examples hereinafter given is particularly suitable as a chewing gum base and, to facilitate and simplify explanation, the following description will be substantially confined to the use of polyvinyl acetates in the preparation of the compositions. A polymer with viscosity between 1.8 and 4 centipoises is now believed to be the most satisfactory.

In order that there will not be any uncertainty as to the physical consistency of the polymers, it may be stated the viscosities herein mentioned are determined as follows:—

The polymer is dissolved in benzene and made up so that at 20° C. one litre contains the simple molecular weight of polymer in grammes. This is filtered into the apparatus through cotton-wool, precautions being taken to avoid loss of solvents. The time of outflow is then determined by the Oswald viscosimeter, which has been standardized on a pure solvent (benzene), of which the absolute viscosity is known in centipoises.

The polyvinyl acetate may be prepared, in general, according to the methods disclosed in United States Patent No. 2,007,557, granted July 9, 1935, and may be combined with between 10% and 50% of suitable fillers, such as infusorial earth, powdered talc or bentonite; with between 10% and 60% or more of a suitable water insoluble plasticizer, such as diamyl, dibutyl, benzyl or glycol phthalate, glycol borate or a rezyl, and, if desired, with between 5% and 50% of water soluble softeners such as polyhydric alcohols, particularly those of the aliphatic series, for example glycerol or a suitable glycol, such as ethylene, butylene, diethylene or propylene glycol, or a mixture of any one or more of these with glycerol.

The amount of filler that can be used is less with polymers of higher viscosity than with polymers of lower viscosity and, conversely, the amount of plasticizer required is greater with polymers of higher viscosity than with those of lower viscosity. The amount of softener used will depend on viscosity of the polyvinyl acetate and the amount of filler and/or plasticizer in the composition and the desired hardness of the composition at ordinary atmospheric temperature and at body temperature.

Polyvinyl acetates of the viscosities stated, even when at body temperature and mixed with a plasticizer, do not take up water and soften as rapidly as is desirable in a chewing gum composition. For this reason, it is desirable to incorporate a water soluble softener which, on initial chewing of the composition, dissolves out rapidly and is replaced in the composition by water to form an emulsion of the desired consistency.

The requirements of suitable plasticizers are compatibility with the polyvinyl ester; insolubility in water and saliva; substantial tastelessness; and absence of any toxic or undesirable physiological effect. These requirements are met by the higher esters of phthalic acid, for instance, diamyl and dibutyl phthalate. Neither of these esters is completely tasteless of itself, but their solubility in saliva is so decreased in presence of polyvinyl acetate that the resulting product is tasteless.

Obviously, the softening agent must be compatible with the polyvinyl ester and must not have any undesirable taste or physiological effect.

The following examples will illustrate various methods of practicing the invention:—

Example I

A mixture composed of 30 parts of toluene, 70 parts of vinyl acetate containing not more than .05% of acetaldehyde, and 0.6 part of catalyst prepared from sodium perborate and acetic anhydride, as described in Patent No. 2,007,557 is placed in a kettle, preferably enamel lined, and fitted with a return flow condenser, and efficient agitator, a thermometer and a draw-off line connected to the kettle through a seal. The contents of the kettle are heated until refluxing begins. As polymerization proceeds, the temperature rises. When a temperature of 87° to 88° C. is attained, a mixture of vinyl acetate, toluene and catalyst in the same proportions as the initial charge is run in at such rate that the temperature remains constant at 87° to 88° C. Eventually, the mixture of unchanged vinyl acetate, toluene and polyvinyl acetate reaches the draw-off and overflows therethrough into a container or into a still fitted up for steam distillation. The process may be run continuously and the polyvinyl acetate, which is separated in the still from toluene and uncharged vinyl acetate, is dried until its contains not more than 1% of water by weight. The viscosity of the polymer is 2.5 centipoises. The wet toluene recovered from the still may be dried and it and the vinyl acetate can be used over again.

The dried polyvinyl acetate is crushed to substantially pulverulent condition and 100 parts by weight are mixed with 25 parts of diamyl phthalate, 35 parts infusorial earth, 18 parts glycerol and 2 parts propylene glycol, at a temperature of about 100° C. until a smooth paste is obtained. Flavoring matter or a medicinal agent may be added as desired. The chewing gum base obtained as above is firm and non-sticky at room temperature and can be readily handled. It may be compounded with sugar and formed into sticks or pellets which are non-sticky and which do not harden during storage for considerable periods of time.

Example II

A mixture of 40 parts toluene, 60 parts vinyl acetate and 1 part of catalyst is polymerized at 90° C. as described in Example I. The polyvinyl product has a viscosity of 1.8 centipoises and can be incorporated with fillers, plasticizers and softeners to produce a satisfactory chewing gum base. In this case, less plasticizer is required as the polymer is softer than that produced according to Example I. 15 parts of plasticizer are sufficient to produce a satisfactory material.

By varying the proportion of toluene between 30% and 40%, a polymer of any desired viscosity between 2.5 and 1.8 centipoises can be readily obtained. By varying the proportion of toluene between 20% and 30%, polymers of viscosity between 2.5 and 3.3 centipoises can be obtained. If polymers of higher viscosities than 3.3 are desired, it is preferable to heat the mixture of vinyl acetate and toluene with the catalyst until it thickens and then discharge the entire contents of the kettle into the steam still. A mixture of 70 parts vinyl acetate, 30 parts toluene and 0.6 part catalyst when treated in this way yields a polymer having a viscosity of 3.5 centipoises, while the product of a mixture of 80 parts vinyl acetate and 20 parts toluene has a viscosity of 6.3 centipoises.

The polymers produced according to any of the above variations of the method may be mixed with fillers, plasticizers and softeners as desired, the amount of filler being less and the amount of plasticizer more for polymers of higher viscosity than for polymers of lower viscosity. The relative proportions of glycerol and glycol may vary considerably from the proportions given in Example I and the proportion of softener to the polymer may be more or less than given in Example I according to the viscosity of the polymer, the amount of plasticizer and filler, and the characteristics desired in the finished product.

Furthermore, polyvinyl acetates of two or more different viscosities made according to the teaching of the foregoing examples may be blended together to produce a chicle substitute, and in such case, the viscosity of one polymer may be more than 6 centipoises and the viscosity of another may be less than 1.5 centipoises.

While the only polyvinyl ester so far dealt with is polyvinyl acetate, it will be understood the polymers of other aliphatic vinyl esters, such as butyl acetate and propyl acetate, may be used instead of vinyl acetate as hereinbefore described, or may be blended with a vinyl acetate polymer and the other ingredients of the composition.

Having thus described my invention, what I claim is:—

1. A chewing gum composition comprising as the essential ingredient polyvinyl ester having an average viscosity between 1.5 and 6 centipoises, characterized by absence of bitterness and prepared from vinyl ester containing not more than substantially .05% of aldehyde.

2. A chewing gum composition comprising as an essential ingredient polyvinyl acetate having an average viscosity between 1.5 and 6 centipoises, characterized by absence of bitterness and prepared from vinyl acetate containing not more than substantially .05% of acetaldehyde.

3. A chewing gum composition comprising polyvinyl acetate having an average viscosity between 1.5 and 6 centipoises, characterized by absence of bitterness and prepared from vinyl acetate containing not more than substantially .05% of aldehyde, and a substantially water insoluble plasticizer for the polymer.

4. A chewing gum composition comprising polyvinyl acetate having an average viscosity between 1.5 and 6 centipoises, characterized by absence of bitterness and prepared from vinyl acetate containing not more than substantially .05% of aldehyde, and a readily water soluble softening agent for the polymer.

5. A chewing gum composition comprising polyvinyl acetate having an average viscosity between 1.5 and 6 centipoises, characterized by absence of bitterness and prepared from vinyl acetate containing not more than substantially .05% of aldehyde, a substantially water insoluble plasticizer for the polymer, and a mineral filler.

6. A chewing gum composition comprising polyvinyl acetate having an average viscosity between 1.5 and 6 centipoises, characterized by absence of bitterness and prepared from vinyl acetate containing not more than substantially .05% of aldehyde, a readily water soluble softening agent for the polymer and a mineral filler.

7. A chewing gum composition according to claim 5 in which the mineral filler is included in the group consisting of kieselguhr, talc and bentonite.

8. A chewing gum base comprising as an essential ingredient polyvinyl ester having an average viscosity between 1.5 and 6 centipoises, characterized by absence of bitterness and prepared from vinyl ester containing not more than substantially .05% of aldehyde.

9. A chewing gum base comprising as an essential ingredient polyvinyl acetate having an average viscosity between 1.5 and 6 centipoises, characterized by absence of bitterness and prepared from vinyl acetate containing not more than substantially .05% of aldehyde.

10. A chewing gum composition comprising a mixture of vinyl ester polymers prepared from vinyl ester containing not more than substantially .05% of aldehyde and having an average viscosity between 1.5 and 6 centipoises.

KENNETH G. BLAIKIE.